US012725603B2

(12) United States Patent
Belanger et al.

(10) Patent No.: US 12,725,603 B2
(45) Date of Patent: Sep. 1, 2026

(54) MULTI-ELEMENT ELECTROMAGNETIC ACOUSTIC TRANSDUCER FOR GUIDED WAVE GENERATION AND DETECTION

(71) Applicant: ECOLE DE TECHNOLOGIE SUPERIEURE, Montréal (CA)

(72) Inventors: Pierre Belanger, Montreal (CA); Aurélien Thon, Montreal (CA)

(73) Assignee: ECOLE DE TECHNOLOGIE SUPERIEURE, Montreal (CA)

( * ) Notice: Subject to any disclaimer, the term of this patent is extended or adjusted under 35 U.S.C. 154(b) by 313 days.

(21) Appl. No.: 18/219,982

(22) Filed: Jul. 10, 2023

(65) Prior Publication Data

US 2024/0013767 A1 Jan. 11, 2024

Related U.S. Application Data

(60) Provisional application No. 63/359,641, filed on Jul. 8, 2022.

(51) Int. Cl.

| | |
|---|---|
| ***G10K 11/32*** | (2006.01) |
| ***B06B 1/04*** | (2006.01) |
| ***G01N 29/22*** | (2006.01) |
| ***G01N 29/26*** | (2006.01) |
| ***G10K 11/34*** | (2006.01) |

(52) U.S. Cl.

CPC .............. *G10K 11/32* (2013.01); *B06B 1/045* (2013.01); *G01N 29/223* (2013.01); *G01N 29/262* (2013.01); *G10K 11/346* (2013.01); *B06B 2201/53* (2013.01)

(58) Field of Classification Search

CPC ...... G10K 11/32; G10K 11/346; B06B 1/045; B06B 2201/53; G01N 29/223; G01N 29/262

See application file for complete search history.

(56) References Cited

U.S. PATENT DOCUMENTS

| | | | | |
|---|---|---|---|---|
| 4,127,035 | A * | 11/1978 | Vasile | B06B 1/04 73/629 |
| 2009/0139337 | A1* | 6/2009 | Owens | G01N 29/30 73/622 |
| 2022/0214313 | A1* | 7/2022 | Balasubramanian | G01N 29/348 |
| 2023/0314385 | A1* | 10/2023 | Liu | G01N 29/04 73/629 |

OTHER PUBLICATIONS

Cawley, P., “Practical Long Range Guided Wave Inspection-Applications to Pipes and Rail”, Engineering, Materials Science, 2002.

(Continued)

*Primary Examiner* — Xin Y Zhong
(74) *Attorney, Agent, or Firm* — NORTON ROSE FULBRIGHT CANADA LLP

(57) ABSTRACT

There is provided an electromagnetic acoustic transducer comprising a waveguide having a surface, and a plurality of spaced elements arranged in an array on the surface of the waveguide. Each element of the plurality of elements comprises a magnet and a coil wound around the magnet. A direction of magnetization of the plurality of elements alternating from one of the plurality of elements to a next one of the plurality of elements.

21 Claims, 10 Drawing Sheets

(56) References Cited

OTHER PUBLICATIONS

Alleyne et al., "Rapid, long range inspection of chemical plant pipework using guided waves", AIP Conf. Proc. 557, 180-187 (2001), DOI: 10.1063/1.1373757.
Alleyne et al., "The Reflection of Guided Waves From Circumferential Notches in Pipes", J. Appl. Mech., 65(3): 635-641, 1998, DOI: 10.1115/1.2789105.
Chan et al., "High frequency guided ultrasonic waves for hidden fatigue crack growth monitoring in multi-layer model aerospace structures", Smart Mater. Struct. 24 025037, 2015, DOI: 10.1088/0964-1726/24/2/025037.
Travaglini et al., "Feasibility of high frequency guided wave crack monitoring", Structural Health Monitoring, vol. 16 (4) 418-427, 2017, DOI: 10.1177/1475921716673567.
Yu et al., "Remote monitoring of bond line defects between a composite panel and a stiffener using distributed piezoelectric sensors", Smart Mater. Struct. 27 035014, 2018, DOI: 10.1088/1361-665X/aaa69b.
Comot et al., "Ultrasonic guided wave inspection of Inconel 625 brazed lap joints: Simulation and experimentation", NDT and E International 91 (2017) 71-78, DOI: 10.1016/j.ndteint.2017.06.007.
Belanger, Pierre, "High order shear horizontal modes for minimum remnant thickness" Ultrasonics, 54, 2014, DOI: 10.1016/j.ultras.2013.12.013.
Thon et al., "EMAT design for minimum remnant thickness gauging using high order shear horizontal modes", Ultrasonics, 95, 2019, DOI: 10.1016/j.ultras.2019.03.006.
Thon et al., "Optimization of a Lorentz forces EMAT for the reconstruction of the circumferential thickness profile of a steel pipe using high order shear horizontal modes", NDT & E International, 128, 2022, DOI: 10.1016/j.ndteint.2022.102631.
Isla et al., "EMAT phased array: A feasibility study of surface crack detection", Ultrasonics, 78, 2017, DOI: 10.1016/j.ultras.2017.02.009.
Pucci et al., "Design of a Phased Array EMAT for Inspection Applications in Liquid Sodium" Sensors, 2019, DOI: 10.3390/s19204460.
Veit et al., "An ultrasonic guided wave excitation method at constant phase velocity using ultrasonic phased array probes" Ultrasonics, 102, 2020, DOI: 10.1016/j.ultras.2019.106039.
Alleyne et al., "A two-dimensional Fourier transform method for the measurement of propagating multimode signals", J. Acoust. Soc. Am. 89, 1159-1168, 1991, DOI: 10.1121/1.400530.
Rose, Joseph L., "Ultrasonic Guided Waves in Solid Media", Cambridge University Press, 2014, DOI: 10.1017/CBO9781107273610.
Belanger et al., "Guided Wave Diffraction Tomography Within the Born Approximation", IEEE Transactions on Ultrasonics, Ferroelectrics, and Frequency Control, 2010, DOI: 10.1109/TUFFC.2010.1559.
Huthwaite et al., "High-resolution guided wave tomography", Wav Motion, 50, 2013, DOI: 10.1016/j.wavemoti.2013.04.004.
Zimmerman et al., "High-resolution thickness maps of corrosion using SH1 guided wave tomography", Proceedings of the Royal Society A, 2021, DOI: 10.1098/rspa.2020.0380.
Suresh et al., "Quantifying the lowest remnant thickness using a novel broadband wavelength and frequency EMAT utilizing the cut-off property of guided waves", NDT & E International, 2020, DOI: 10.1016/j.ndteint.2020.102313.
Graff, Karl F., "Wave Motion in Elastic Solids", Dover Publications Inc., 1975, ISBN: 0-486-66745-6.
Krautkramer et al., "Ultrasonic Testing of Materials", Library of Congress Cataloging, 1969, ISBN: 978-3-662-10682-2.
Petcher et al., "Shear horizontal (SH) ultrasound wave propagation around smooth corners", Ultrasonics, 2014, DOI: 10.1016/j.ultras.2013.11.011.
Li et al., "Implementing Guided Wave Mode Control by Use of a Phased Transducer Array", IEEE Transactions on Ultrasonics, Ferroelectrics, and Frequency Control, 2001, DOI: 10.1109/58.920708.
Zhu et al., "Lamb Wave Generation and Reception with Time-Delay Periodic Linear Arrays: A BEM Simulation and Experimental Study", IEEE transactions on ultrasonics, ferroelectrics, and frequency control, 1999, DOI: 10.1109/58.764852.
Vasile et al., "Excitation of horizontally polarized shear elastic waves by electromagnetic transducers with periodic permanent magnets", J. Appl. Phys. 50, 2583-2588 (1979), DOI: 10.1063/1.326265.
Ribichini, Remo, "Modelling of electromagnetic acoustic transducers", Imperial College London, 2011, DOI: 10.25560/9010.
Sun et al., "Influence of Magnetostriction Induced by the Periodic Permanent Magnet Electromagnetic Acoustic Transducer (PPM EMAT) on Steel", Sensors 2021, 21(22), 7700, DOI: 10.3390/s21227700.
Isla et al., "Optimization of the Bias Magnetic Field of Shear Wave EMATs", IEEE Transactions on Ultrasonics, Ferroelectrics, and Frequency Control, 2016, DOI: 10.1109/TUFFC.2016.2558467.
Ribinichi et al., "Experimental and numerical evaluation of electromagnetic acoustic transducer performance on steel materials" NDT & E International, 2012, DOI: 10.1016/j.ndteint.2011.08.007.
Ribinichi et al., "The impact of magnetostriction on the transduction of normal bias field EMATs", NDT & E International, 2012, DOI: 10.1016/j.ndteint.2012.06.004.
Drozd, Michael Brice, "Efficient Finite Element Modelling of Ultrasound Waves in Elastic Media", Imperial College of Science Technology and Medicine, 2008, https://www.imperial.ac.uk/media/imperial-college/research-centres-and-groups/non-destructive-evaluation/Mickael_Drozdz_Thesis.pdf.
Huthwaite, Peter, "Accelerated finite element elastodynamic simulations using the GPU", Journal of Computational Physics, 257 (2014) 687-707, DOI: 10.1016/j.jcp.2013.10.017.
Drozd et al., "Efficient Numerical Modelling of Absorbing Regions for Boundaries of Guided Waves Problems", AIP Conf. Proc. 820, 126-133 (2006), DOI: 10.1063/1.2184520.
Cook et al., "Concepts and Applications of Finite Element Analysis", Wiley 2001, ISBN 0471356050.
Garverich, Linda, "Corrosion in the Petrochemical Industry", ASM International, 1709, ISBN: 0871705052.
Britton, James N., "Corrosion at pipe supports: Causes and solutions", InterResources Inc., 2002, https://stoprust.com/media/3722/2002-corrosion-at-pipe-supports-causes-and-solutions-j-britton.pdf.
De Vogelaere, Frank, "Corrosion Under Insulation", Wiley InterScience, 2008, DOI: 10.1002/prs. 10276.
Rose et al., "Next generation guided wave health monitoring for long range inspection of pipes", Journal of Loss Prevention in the Process Industries, 2009, DOI: 10.1016/j.jlp.2009.08.011.
Ho et al., "Nondestructive Testing and Evaluation", vol. 22 (No. 1). pp. 19-34, 2007, DOI:10.1080/10589750701327890.
Luo et al., "A Guided Wave Plate Experiment for a Pipe", J. Pressure Vessel Technol. Aug. 2005, 127(3): 345-350, DOI: 10.1115/1.1989351.
Velichko, Alexander, "Excitation and scattering of guided waves: Relationships between solutions for plates and pipes", J. Acoust. Soc. Am. 125, 3623-3631 (2009), DOI: 10.1121/1.3117441.
Pavlakovic et al., "Disperse: A General Purpose Program for Creating Dispersion Curves", Review of Progress in Quantitative Nondestructive Evaluation, 1997, DOI: 10.1007/978-1-4615-5947-4_24.
Cheeke, David J.N., "Fundamentals and Applications of Ultrasonic Waves", CRC Press, Taylor & Francis Group, LLC, 2012, ISBN: 13: 978-1-4398-5498-3.
Nurmalia et al., "Mode conversion behavior of SH guided wave in a tapered plate", NDT&E International 45 (2012) 156-161, DOI: 10.1016/j.ndteint.2011.10.004.
Nakamura et al., "Mode Conversion and Total Reflection of Torsional Waves for Pipe Inspection", Japanese Journal of Applied Physics, vol. 52, No. 7S, 2013, DOI 10.7567/JJAP.52.07HC14.

* cited by examiner

MULTI-ELEMENT ELECTROMAGNETIC ACOUSTIC TRANSDUCER FOR GUIDED WAVE GENERATION AND DETECTION

CROSS-REFERENCE TO RELATED APPLICATIONS

The present application claims priority on U.S. Patent Application No. 63/359,641 filed Jul. 8, 2022, the entire contents of which are incorporated herein by reference.

FIELD

The present disclosure generally relates to guided wave inspection of materials, and more particularly to the use of a multi-element electromagnetic acoustic transducer for guided wave generation and detection.

BACKGROUND

Ultrasonic guided wave screenings have proven to be fast and reliable to detect various types of defects in plate-like structures. Low frequency ultrasonic guided waves are nowadays routinely used to screen long sections of pipelines. For a number of years, ultrasonic guided waves at a frequency beyond the cutoff of the first high order mode have attracted interest due to the plurality of modes that can propagate. When operating at a frequency beyond the cutoff of the first high order mode, the excitation mechanism becomes important to selectively excite a single high order mode or a group of high order modes. Ultrasonic comb transducers offer the possibility to selectively excite and detect high order ultrasonic guided waves at a desired wavelength. Linear array transducers are even more flexible and allow virtually full control in the frequency wavenumber space. High order shear horizontal (SH) modes have multiple potential applications including, for example, remote thickness gauging and crack monitoring. However, these modes are notoriously difficult to excite and detect using conventional piezoelectric transducers. Electromagnetic acoustic transducers (EMAT) make the excitation and detection of SH modes relatively simple. Periodic permanent magnet (PPM) EMAT can be used to selectively excite and detect high order SH modes based on a desired wavelength. However, in some applications, it may be desirable to excite and detect high order SH modes with more control in the frequency wavenumber space.

Accordingly, there remains a need for improvement.

SUMMARY

In accordance with one aspect, there is provided an electromagnetic acoustic transducer comprising a waveguide having a surface, and a plurality of spaced elements arranged in an array on the surface of the waveguide, each element of the plurality of elements comprising a magnet and a coil wound around the magnet, a direction of magnetization of the plurality of elements alternating from one of the plurality of elements to a next one of the plurality of elements.

In some embodiments, the waveguide is made of a ferromagnetic and conductive material.

In some embodiments, the plurality of elements are in direct contact with the surface of the waveguide.

In some embodiments, the waveguide is a plate-like structure.

In some embodiments, the waveguide is a section of pipeline.

In some embodiments, the direction of magnetization of each element of the plurality of elements is orthogonal to the surface of the waveguide.

In some embodiments, the plurality of elements are arranged in a linear array.

In some embodiments, the plurality of elements are arranged in a two-dimensional array.

In some embodiments, each coil is configured to be supplied with an excitation signal via comb excitation in which the plurality of elements are substantially simultaneously activated with the excitation signal.

In some embodiments, each coil is configured to be supplied with an excitation signal via phase velocity excitation in which the plurality of elements are activated with the excitation signal with a time delay.

In some embodiments, the plurality of elements are spaced from one another by a regular distance.

In some embodiments, the plurality of elements are spaced from one another by an irregular distance.

In some embodiments, the waveguide is configured to have an ultrasonic wave propagating therein, along a direction of propagation substantially perpendicular to the direction of magnetization of the plurality of elements.

In some embodiments, the ultrasonic wave is a Lamb wave comprising a plurality of symmetrical modes and a plurality of antisymmetrical modes.

In some embodiments, the ultrasonic wave is a shear horizontal (SH) wave.

In accordance with another aspect, there is provided a method for providing an electromagnetic acoustic transducer, the method comprising providing a plurality of elements, each element of the plurality of elements comprising a magnet and a coil wound around the magnet, providing a waveguide having a surface, and arranging the plurality of elements in an array on the surface of the waveguide, with a direction of magnetization of the plurality of elements alternating from one of the plurality of elements to a next one of the plurality of elements.

In some embodiments, the plurality of elements are arranged in one of a linear array and a two-dimensional array.

In some embodiments, the method further comprises supplying an excitation signal to each coil via comb excitation.

In some embodiments, the method further comprises supplying an excitation signal to each coil via phase velocity excitation.

In some embodiments, arranging the plurality of elements in the array comprises spacing the plurality of elements from one another by one of a regular and an irregular distance.

Many further features and combinations thereof concerning embodiments described herein will appear to those skilled in the art following a reading of the instant disclosure.

DESCRIPTION OF THE FIGURES

In the figures.

It will be noticed that throughout the appended drawings, like features are identified by like reference numerals.

DETAILED DESCRIPTION

Figure 1:
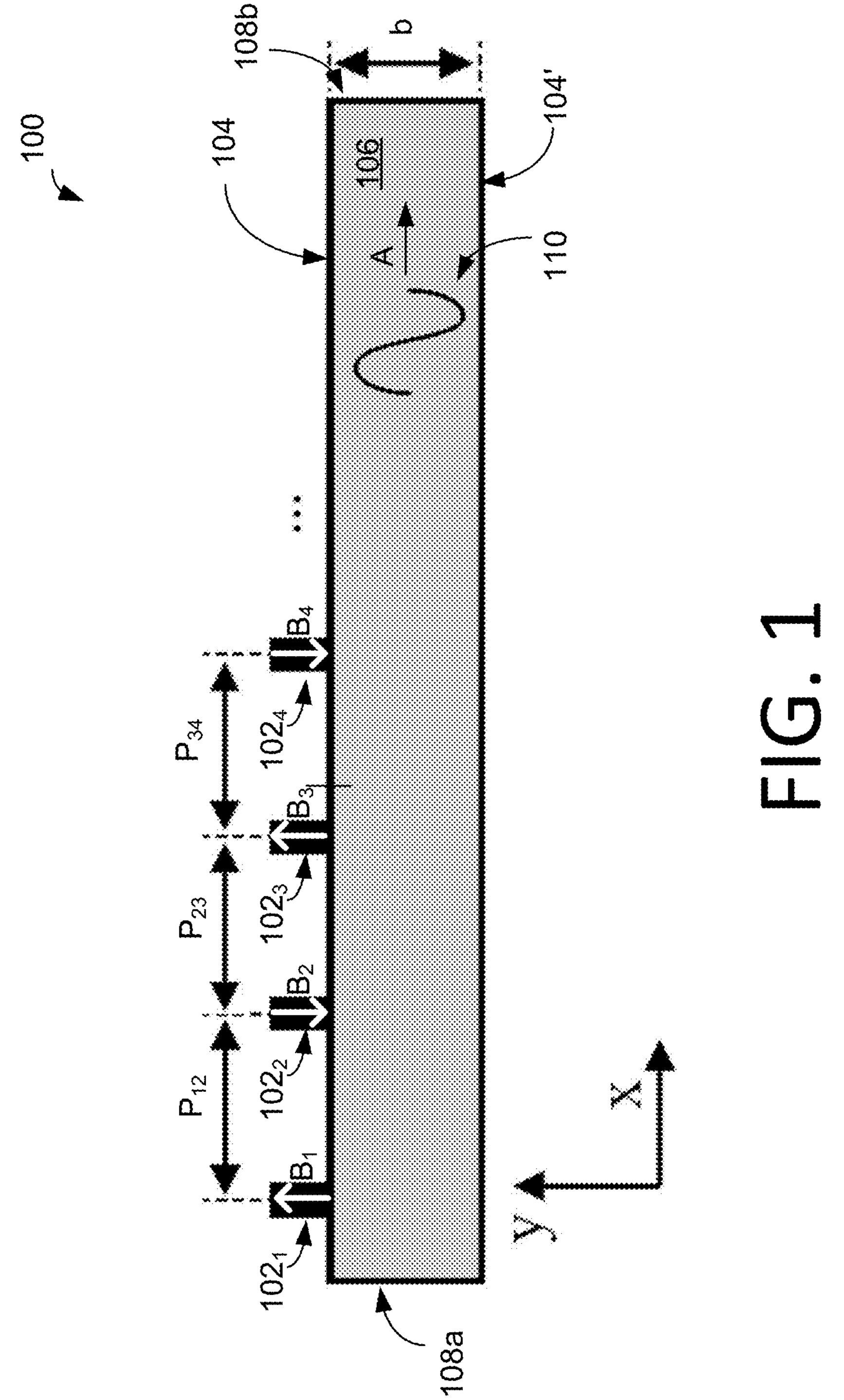
FIG. 1 is a schematic diagram of a multi-element electromagnetic acoustic transducer, in accordance with an illustrative embodiment.
Figure 2A:
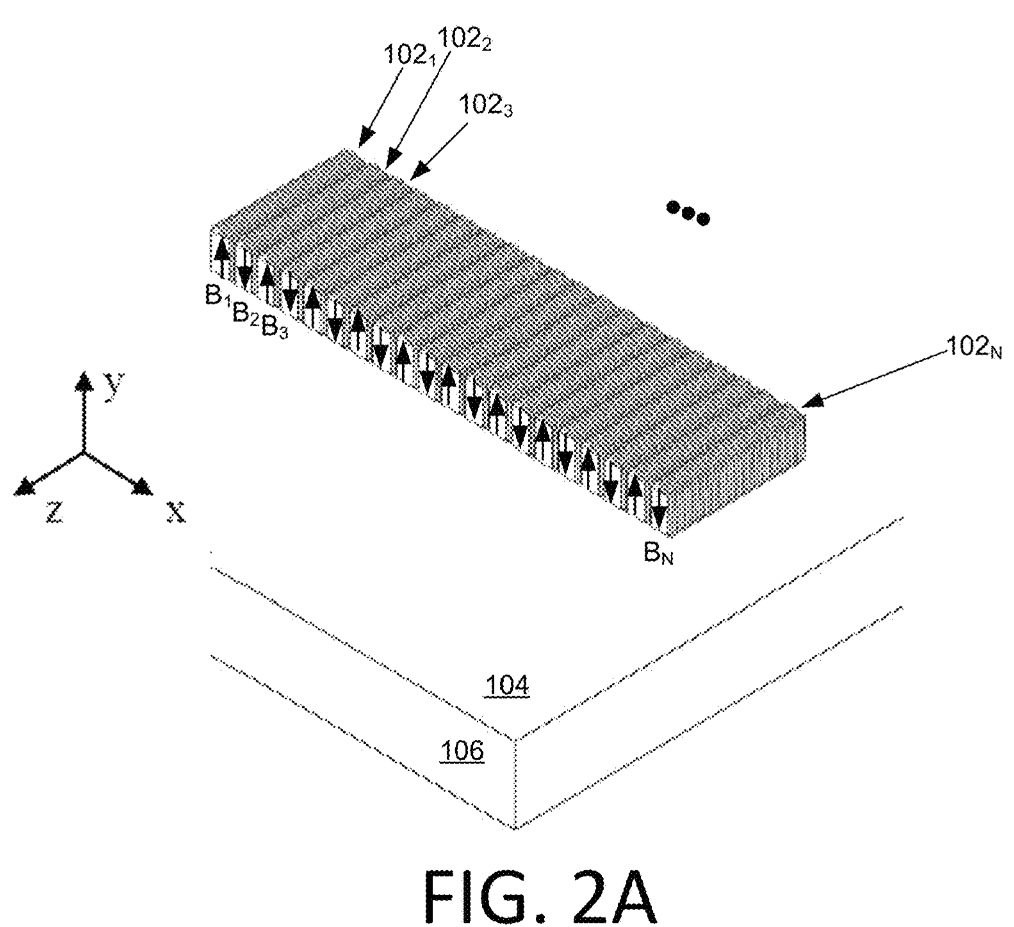
FIG. 2A is a perspective view of the multi-element electromagnetic acoustic transducer of FIG. 1, in accordance with an illustrative embodiment.

Referring now to FIG. 1 and FIG. 2A, a multi-element electromagnetic acoustic transducer (EMAT) 100 for performing ultrasonic guided wave generation and/or detection will now be described, in accordance with one embodiment. The EMAT 100 comprises a plurality (N) of elements $102_1$, $102_2$, $102_3$, . . . , $102_N$ provided on a surface 104 of a waveguide 106. While four (4) elements $102_1$, $102_2$, $102_3$, $102_4$ are illustrated in FIG. 1 (i.e. N=4), it should be understood that this is for illustrative purposes only and the EMAT 100 may comprise any suitable number (N) of elements $102_1$, $102_2$, $102_3$, . . . , $102_N$. In some embodiments, the plurality of elements $102_1$, $102_2$, $102_3$, . . . , $102_N$ may be arranged in a linear (i.e. one-dimensional) array, although other possibilities may apply as further described herein below.

Any two adjacent elements of the plurality of elements $102_1$, $102_2$, $102_3$, . . . , $102_N$ are spaced apart by a given distance (also referred to herein as a "pitch"). More specifically, the pitch is the distance between the center of two adjacent ones of the elements $102_1$, $102_2$, $102_3$, . . . , $102_N$. For example, as illustrated in FIG. 1, the element $102_1$ is spaced apart from the element $102_2$ by a pitch $P_{12}$, the element $102_2$ is spaced apart from the element $102_3$ by a pitch $P_{23}$, and the element $102_3$ is spaced apart from the element $102_4$ by a pitch $P_{34}$. In some embodiments, the pitch between adjacent elements of the plurality of elements $102_1$, $102_2$, $102_3$, . . . , $102_N$ may be equal, while in other embodiments, the pitch between adjacent elements of the plurality of elements $102_1$, $102_2$, $102_3$, . . . , $102_N$ may be different. For example, in the embodiment illustrated in FIG. 1, the pitches $P_{12}$, $P_{23}$, and $P_{34}$ have an equal value, such that the EMAT 100 has a regular pitch. It should however be understood that the pitches $P_{12}$, $P_{23}$, and $P_{34}$ may have different values, such that the EMAT 100 has an irregular pitch that varies along a length of the EMAT 100.

In some embodiments, the plurality of elements $102_1$, $102_2$, $102_3$, . . . , $102_N$ may be provided on the surface 104 of the waveguide 106 without the use of a couplant (e.g., gel, or the like) that may be required in piezoelectric ultrasonic phased array probes (to ensure efficient transmission of the mechanical perturbation from the piezoelectric crystal to the inspected material). In other words, the plurality of elements $102_1$, $102_2$, $102_3$, . . . , $102_N$ may be in direct contact with the surface 104 of the waveguide 106. Although the plurality of elements $102_1$, $102_2$, $102_3$, . . . , $102_N$ are shown as being provided on the surface 104 of the waveguide 106, it should also be understood that the plurality of elements $102_1$, $102_2$, $102_3$, . . . , $102_N$ may alternatively be provided on any other suitable surface of the waveguide 106. In the embodiment of FIG. 1, the waveguide 106 has a first (or top) surface 104, a second (or bottom) surface 104' opposite the first surface 104, a first edge (or boundary) **108*a*, and a second edge (or boundary) 108*b* opposite the first edge 108*a*. Depending on the application, the plurality of elements $102_1$, $102_2$, $102_3$, . . . , $102_N$ may, for example, be provided on the bottom surface 104' rather than on the top surface 104 of the waveguide 106**.

The waveguide 106 may comprise any suitable conductive material and may have any suitable shape. The waveguide material may be homogeneous and isotropic. In some embodiments, the waveguide 106 comprises a ferromagnetic and conductive material, for instance steel. In some embodiments, the waveguide 106 may be substantially planar (for example, a sheet of metal). In some embodiments, the waveguide 106 may comprise a plate-like structure having a complex region to be inspected (not shown). In some embodiments, the plate-like structure may comprise a section of pipeline (not shown). In other embodiments, the waveguide 106 may be substantially curved (for example, a cylindrical section). Other embodiments may apply depending on the application.

A guided ultrasonic wave 110 propagates in the waveguide 106, for instance between the first edge **108*a* and the second edge 108*b* of the waveguide 106, along a direction of propagation A that is substantially perpendicular to the direction of magnetization of the plurality of elements $102_1$, $102_2$, $102_3$, . . . , $102_N$. It should be noted that although the direction of propagation A is shown in FIG. 1 as being in the positive x-direction (+x), i.e. from the first (or left) edge 108*a* to the second (or right) edge 108*b*, the guided ultrasonic wave 110 may also propagate in another direction, for instance in the negative x-direction (−x), i.e. from the second (or right) edge 108*b* to the first (or left) edge 108*a*. In some embodiments, the guided ultrasonic wave 110 may be generated and/or detected by the EMAT 100 as further described herein below. The guided ultrasonic wave 110 may comprise a Lamb wave, including both symmetrical modes ($S_0$, $S_1$, $S_2$, . . . ) and antisymmetrical modes ($A_0$, $A_1$, $A_2$, . . . ). In some embodiments, the guided ultrasonic wave 110** may comprise a shear horizontal (SH) wave and/or modes thereof (of which $SH_0$ designates the fundamental mode and $SH_1$, $SH_2$, etc. designate higher order modes).

Figure 2B:
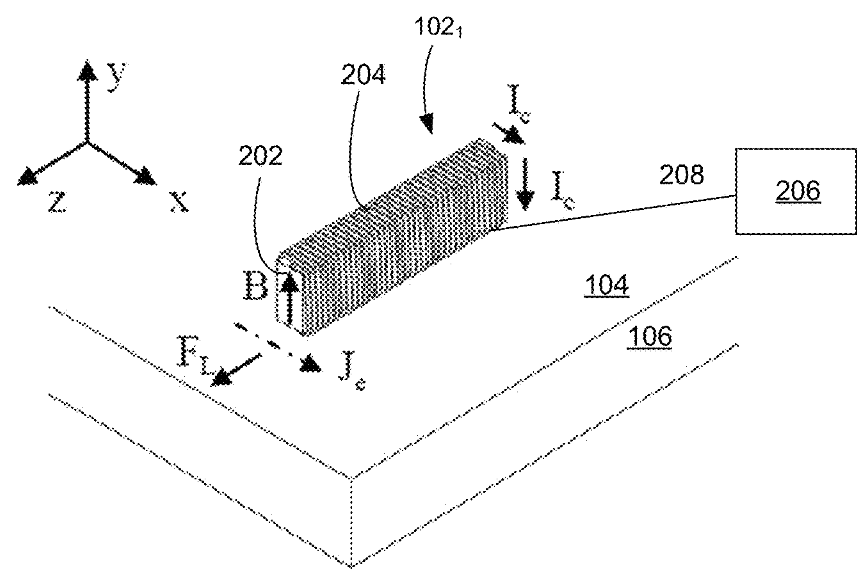
FIG. 2B is a perspective view of one element of the multi-element electromagnetic acoustic transducer of FIG. 2A, in accordance with an illustrative embodiment.

Referring to FIG. 1, FIG. 2A, and FIG. 2B, each element of the plurality of elements $102_1$, $102_2$, $102_3$, . . . , $102_N$ (with only element $102_1$ being shown in FIG. 2B for sake of clarity and illustration) comprises a magnet 202 and a coil 204 (see FIG. 2B). The size of the magnets 202 and the diameter of each coil 204 determines the pitch of the EMAT 100. The coil 204 may comprise at least one turn of electrically conductive wire wound around the magnet 202 in a clockwise or counterclockwise direction, thereby defining a direction of magnetization for each transducer element (with the magnetic field generated by each magnet 202 being indicated by arrow B). In the illustrated embodiment, the magnets 202 are elongated and have a substantially rectangular cross-section, and each coil 204 is wrapped along a length of a corresponding magnet 202 (i.e. along the z direction). It should however be understood that, depending on the application, the magnets 202 may have any other suitable shape (including, but not limited to, a curved shape), and may be wound in any other suitable manner, as described further below. The magnets 202 may also have any suitable size and may be made of any suitable magnetic material.

In order to assemble the elements $\mathbf{102}_1$, $\mathbf{102}_2$, $\mathbf{102}_3$, . . . , $\mathbf{102}_N$ as an array (which may be one-dimensional or two-dimensional), the directions of magnetization of any two adjacent elements of the plurality of elements $\mathbf{102}_1$, $\mathbf{102}_2$, $\mathbf{102}_3$, . . . , $\mathbf{102}_N$ are oriented opposite to each other, such that the direction of magnetization of the transducer elements alternates with a given spatial period corresponding to twice the transducer's pitch. By reversing the direction of magnetization at each transducer element $\mathbf{102}_1$, $\mathbf{102}_2$, $\mathbf{102}_3$, . . . , or $\mathbf{102}_N$, the magnetic poles of the magnets 202 alternate. This implies that, for a given motion of the waveguide 106, two successive elements $\mathbf{102}_1$, $\mathbf{102}_2$, $\mathbf{102}_3$, . . . , $\mathbf{102}_N$ generate opposite currents. By reversing the wiring direction of each coil 204, it becomes possible to have a uniform Lorentz force field across all elements $\mathbf{102}_1$, $\mathbf{102}_2$, $\mathbf{102}_3$, . . . , $\mathbf{102}_N$.

For instance, in the embodiment of FIG. 1, the element $\mathbf{102}_1$ has a first direction of magnetization (and the magnetic field generated by the magnet is indicated by arrow Bi), the element $\mathbf{102}_2$ has a second direction of magnetization (and the magnetic field generated by the magnet is indicated by arrow B 2) opposite to the first direction of magnetization, the element $\mathbf{102}_3$ has a third direction of magnetization (and the magnetic field generated by the magnet is indicated by arrow B 3) opposite to the second direction of magnetization (and thus same as the first direction of magnetization), and the element $\mathbf{102}_4$ has a fourth direction of magnetization (and the magnetic field generated by the magnet is indicated by arrow B 4) opposite to the third direction of magnetization (and thus same as the second direction of magnetization). In the illustrated embodiment, the direction of magnetization of each of the plurality of elements $\mathbf{102}_1$, $\mathbf{102}_2$, $\mathbf{102}_3$, . . . , $\mathbf{102}_N$ is orthogonal to the surface 104 of the waveguide 106 on which the plurality of elements $\mathbf{102}_1$, $\mathbf{102}_2$, $\mathbf{102}_3$, . . . , $\mathbf{102}_N$ are placed. The direction of magnetization may however vary, depending on the application, the geometry of the waveguide 106, and/or the positioning of the plurality of elements $\mathbf{102}_1$, $\mathbf{102}_2$, $\mathbf{102}_3$, . . . , $\mathbf{102}_N$ onto the waveguide 106. For instance, while the coils 204 are illustrated and described herein as being wound along the length of the magnets 202, the coils 204 may be wound differently, resulting in a change in a direction of Eddy currents and thus in the Lorentz forces generated by the EMAT 100. For example, each coil 204 may be wound along the width (i.e. along the x direction) of the corresponding magnet 202. This may allow for inspection of different defects of a material under inspection.

As shown in FIG. 2B, the coil 204 may be supplied with an excitation signal generated by an excitation system 206 electrically coupled (e.g., via electrical wire 208 or any other suitable electrical coupling means) to the coil 204. In some embodiments, the excitation signal may cause an excitation current Ic to circulate in the coil 204. In some embodiments, the excitation signal may be a single or multi-cycle Hann-windowed toneburst centered around a central frequency. When the coil 204 is supplied with the excitation signal, the coil 204 may be said to be "on" or "activated". When the coil 204 is not supplied with the excitation signal, the coil 204 may be said to be "off" or "deactivated". A transducer, for instance the EMAT 100, may be said to in an "on" or "activated" mode (also referred to herein as an "excited" mode) when at least some of its elements, for instance one or more of the plurality of elements $\mathbf{102}_1$, $\mathbf{102}_2$, $\mathbf{102}_3$, . . . , $\mathbf{102}_N$, are "on" or "activated".

In the embodiment shown in FIG. 2B, when the coil 204 is supplied with an excitation signal (and the transducer element is placed on a conductive material), an eddy current vector $J_e$ may be generated by the element $\mathbf{102}_1$ in the positive x-direction (+x), as shown in FIG. 2B. A Lorentz force $F_L$ is caused by the interaction between the magnetic field vector B (due to the presence of the magnet 202) and the eddy current vector $J_e$ as follows:

$$F_L = J_e \times B \tag{1}$$

In embodiments where the direction of magnetization of each of the plurality of elements $\mathbf{102}_1$, $\mathbf{102}_2$, $\mathbf{102}_3$, . . . , $\mathbf{102}_N$ is orthogonal to the surface 104 of the waveguide 106, the magnetic field vector B and the eddy current vector $J_e$ are substantially perpendicular, and the Lorentz force $F_L$ may be generated by the element 204 in the positive z-direction (+z), as shown.

In the case of the EMAT 100, each of the elements 104*a*, 104*b*, 104*c*, 104*d*, . . . of the plurality of elements $\mathbf{102}_1$, $\mathbf{102}_2$, $\mathbf{102}_3$, . . . , $\mathbf{102}_N$ may be separately supplied with respective excitation signals via an excitation system, for instance the excitation system 206, which may be electrically coupled to the plurality of elements $\mathbf{102}_1$, $\mathbf{102}_2$, $\mathbf{102}_3$, . . . , $\mathbf{102}_N$. Although a single excitation system 206 is shown, it should be understood that multiple excitation systems 206 may apply.

In some embodiments, the excitation system 206 may activate (or excite) the plurality of elements $\mathbf{102}_1$, $\mathbf{102}_2$, $\mathbf{102}_3$, . . . , $\mathbf{102}_N$ of the EMAT 100 at substantially the same time (i.e. substantially simultaneously) and with the same signal. This technique may be referred to as "comb excitation", and allows control of the excited modes of the guided ultrasonic wave 110 as a function of the distance (or the pitch) between adjacent elements $\mathbf{102}_1$, $\mathbf{102}_2$, $\mathbf{102}_3$, . . . , $\mathbf{102}_N$. Using comb excitation, the modes of the ultrasonic guided wave 110 can only be excited as certain wavelengths corresponding to a multiple of the pitch. For comb excitation, the amplitude $A_n(\omega, x)$ of the mode n is given by:

$$A_n(\omega,x) = U \cdot F(\omega) \cdot C_n(x) \cdot H(\omega,x) \tag{2}$$

where U is the particle displacement, $F(\omega)$ is the frequency response of the elements, $C_n(x)$ is the coupling coefficient between the waveguide surface traction and the guided wave mode, and $$H(\omega, k) = \sum_{i=1}^{N} e^{j[\omega t \pm k_x \cdot (x - x_i))]} = \frac{\sin\left(N\frac{k_x p}{2}\right)}{\sin\left(\frac{k_x p}{2}\right)} e^{j[\omega t \pm k_x \cdot (x - x_c))]} \tag{3}$$

where ± is negative for the direction of propagation (for instance the direction of propagation A of the wave 110) and positive for the direction opposite to the direction of propagation, p is the pitch, N is the number of elements, ω is the angular frequency, $$k_x = \frac{\omega}{V_p}$$

is the wavenumber component along the direction of propagation and $x_c$ is the center of the transducer array, for instance the geometrical center (not shown) of the EMAT 100. When p is equal to a multiple of the wavelength $$\lambda = \frac{2\pi}{k_x},$$

then $|H(\omega, x)|$ reaches its maximum. The modes will then be excited at wavelengths equal to a multiple of p. By changing the pitch of the transducer, it is then possible to generate modes at other wavelengths. The multiplication of $|H(\omega)|$ by the frequency spectrum of the signal used allows to estimate in which part of the dispersion curves the energy of the excitation will be distributed, as discussed in further detail herein below.

In other embodiments, the excitation system 206 may activate each of the plurality of elements 102$_1$, 102$_2$, 102$_3$, . . . , 102$_N$ with a time delay, such that the activation of each the plurality of elements 102$_1$, 102$_2$, 102$_3$, . . . , 102$_N$ is staggered relative to one another. In some embodiments, the delay may be linear, although other possibilities may apply. This modified form of comb excitation with a linear delay law is also known as "phase velocity excitation".

When considering a time delay increasing with a step $t_0$ between each element, equation (2) becomes:

$$H(\omega, x) = \sum_{i=1}^{N} e^{j[\omega(t-t_i))\pm k(x-x_i))]} = \frac{\sin\left(N\pi\left(\frac{p}{\lambda} \pm \frac{t_0}{T}\right)\right)}{\sin\left(\pi\left(\frac{p}{\lambda} \pm \frac{t_0}{T}\right)\right)} e^{j\left[\omega\left(t-\frac{N-1}{2}t_0\right)\pm k(x-x_c)\right]} \tag{4}$$

where T is the period. $|H(\omega)|$ will be maximized when $$\frac{p}{\lambda} \pm \frac{t_0}{T} = m,$$

where m is an integer. Therefore, the mode will now be excited at a wavelength depending on the pitch of the transducer and the time step of the delay law $t_0$. It is then possible, by adjusting the delay law, to select the mode to be excited without changing the physical characteristics of the transducer (e.g., the EMAT 100).

A specific case of the phase velocity excitation described above occurs when the pitch of the transducer is small compared to the wavelength, i.e.

$$\frac{p}{\lambda} << 1.$$

When considering the +x direction of propagation, then the closest integer to m is 0. Equation (3) is not defined for m=0 but the equation shows that $|H(\omega)|$ is locally continuous in the neighborhood of m=0. When m=0 then the excited phase velocity no longer depends on the frequency:

$$V_p = \frac{\lambda}{T} = \frac{p}{t_0} \tag{5}$$

This specific case allows an excitation at a constant phase velocity under the condition that $$\frac{p}{\lambda} << 1.$$

In general, the net force F generated by an EMAT transducer, for instance by the EMAT 100, is calculated as follows:

$$F=F_L+F_M \tag{6}$$

where $F_L$ is the Lorentz force and $F_M$ is the magnetostrictive force induced by the plurality of elements 102$_1$, 102$_2$, 102$_3$, . . . , 102$_N$ (or a single element as in 102$_1$) of the EMAT 100.

The net force F generated by an EMAT transducer may be approximated by the Lorentz force $F_L$, neglecting the magnetostrictive force $F_M$:

$$F \approx F_L = J_e \times B \tag{7}$$

where $J_e$ is the eddy current vector, B is the magnetic field vector, and $F_L$ is the Lorentz force induced by the plurality of elements 102$_1$, 102$_2$, 102$_3$, . . . , 102$_N$ (or by the single element 102$_1$) of the EMAT 100.

Figure 3:
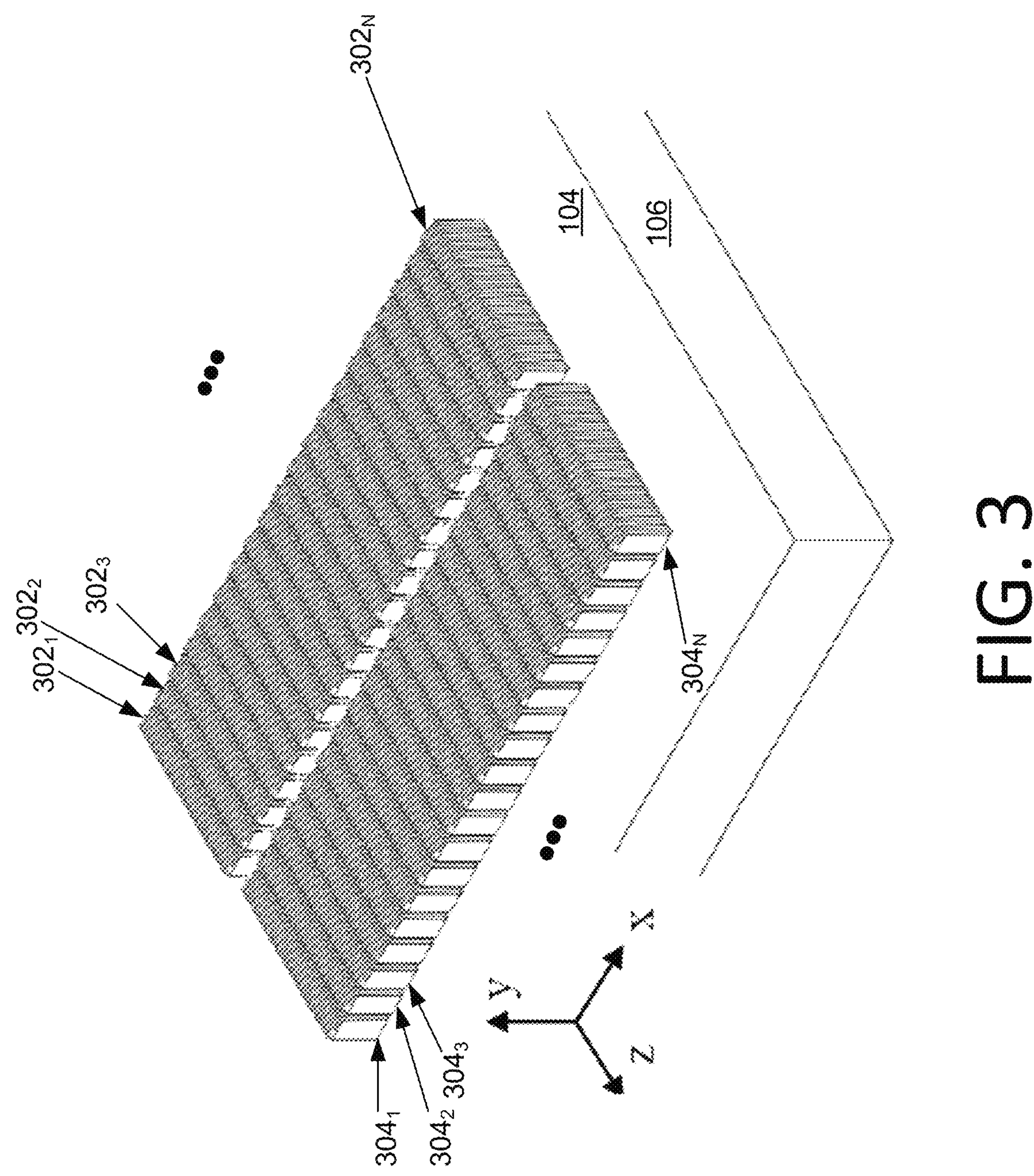
FIG. 3 is a perspective view of a multi-element electromagnetic acoustic transducer, in accordance with another illustrative embodiment.

FIG. 3 shows another embodiment of the EMAT 100 in which the plurality of transducer elements comprises a first set (i.e. a first plurality) of elements 302$_1$, 302$_2$, 302$_3$, . . . , 302$_N$ and a second set (i.e. a first plurality) of elements 304$_1$, 304$_2$, 304$_3$, . . . , 304$_N$. The first plurality of elements 302$_1$, 302$_2$, 302$_3$, . . . , 302$_N$ and the second plurality of elements 304$_1$, 304$_2$, 304$_3$, . . . , 304$_N$ are arranged in a linear (one-dimensional) array (with individual transducer elements being arranged adjacent to one another along the x axis), such that the transducer elements together form a two-dimensional (or matrix) array. It should be understood that any suitable number of sets of transducer elements may apply. For instance, although two sets of elements are shown in FIG. 3, it should be understood that the EMAT 100 may comprise three (3) or more sets of transducer elements. In one embodiments, all individual transducer elements in a given set comprise a magnet 202 and coil 204 combination wound in the manner described above with reference to FIG. 2B.

Figure 4A:
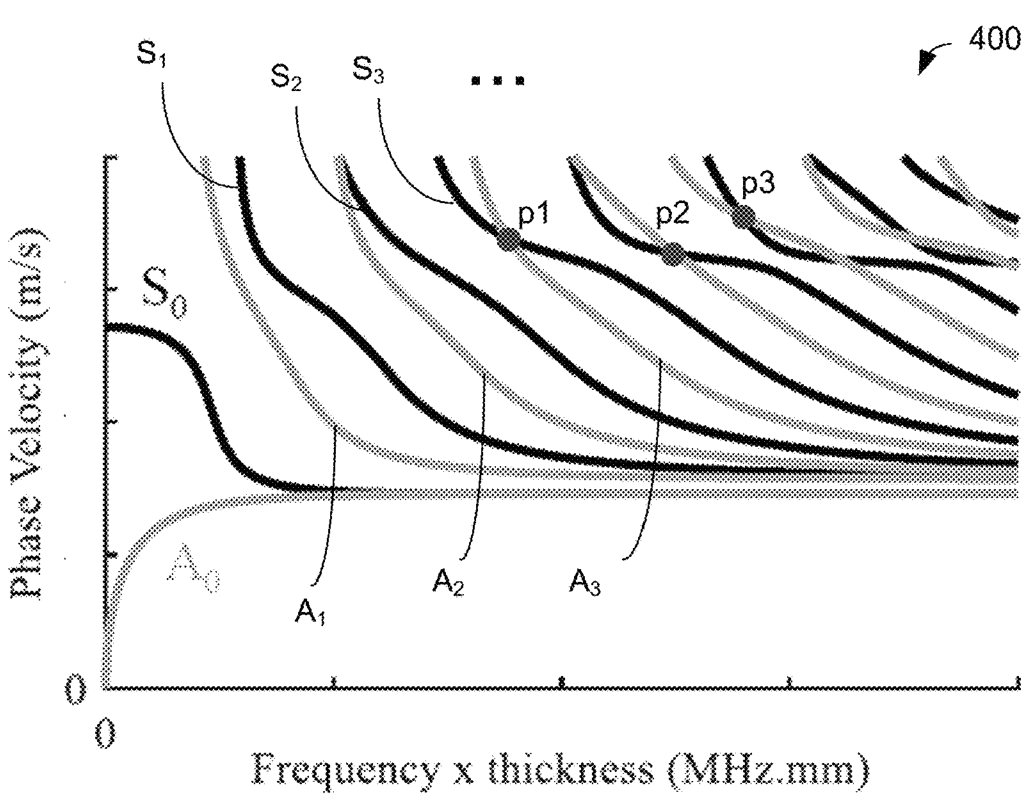
FIG. 4A is a plot of Lamb wave phase velocity dispersion curves as a function of the frequency-thickness product, in accordance with an illustrative embodiment.
Figure 4B:
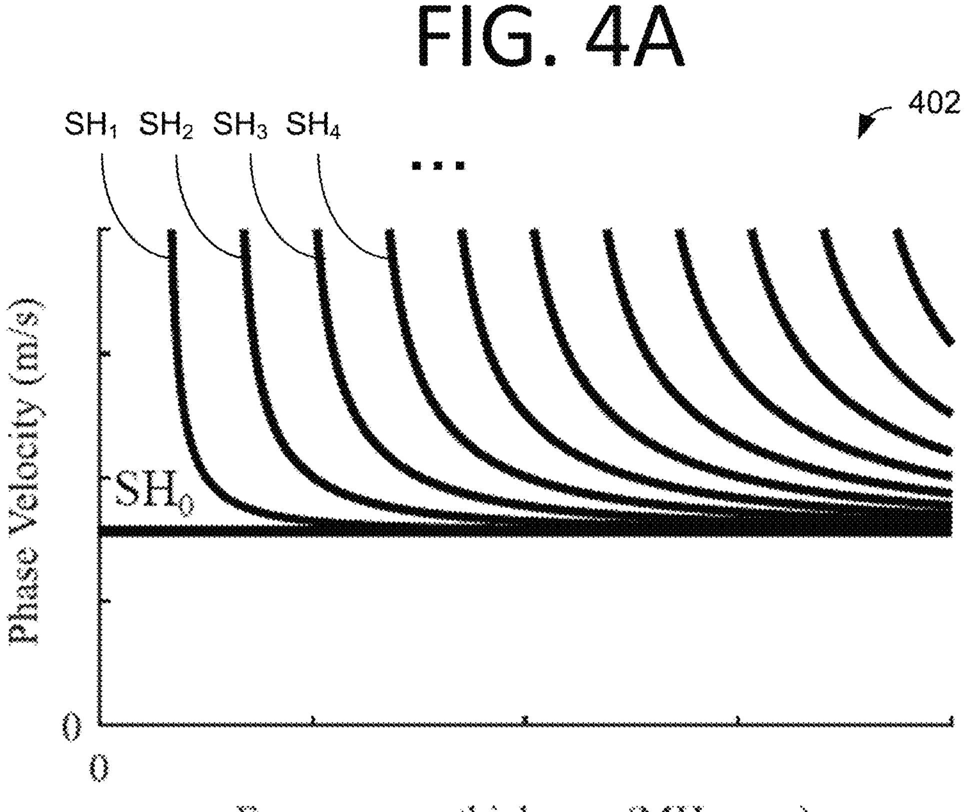
FIG. 4B is a plot of SH wave phase velocity dispersion curves as a function of the frequency-thickness product, in accordance with an illustrative embodiment.

FIG. 4A shows a first plot 400 of dispersion curves for a Lamb wave. FIG. 4B shows a second plot 402 of dispersion curves for a SH wave. The Lamb wave and the SH wave propagate in a structure, for instance in the waveguide 106. The plots 400 and 402 represent phase and group velocities of the different modes that can propagate as a function of the frequency-thickness product. In general, as frequency increases, the number of modes propagating also increases.

In FIG. 4A, symmetrical modes $S_0$, $S_1$, $S_2$, $S_3$, . . . and asymmetrical modes $A_0$, $A_1$, $A_2$, $A_3$, . . . of the Lamb wave are plotted. Intersection points may be observed, on the dispersion curves of plot 400, between symmetrical and asymmetrical modes of the Lamb wave, for instance at points p1, p2, and p3 (other points not shown). These intersections may be undesirable in some conditions.

Depending on a thickness of the waveguide 106, two types of modes may propagate. On the one hand, the fundamental modes $S_0$ and $A_0$ (for Lamb waves) and $SH_0$ (for SH waves) can propagate regardless of the frequency-thickness product, as seen from plots 400 and 402. On the other hand, the higher-order modes ($S_1$ and above and $A_1$ and above for Lamb waves, and $SH_1$ and above for SH waves) are constrained to propagate only above a certain frequency-thickness product threshold, known as the cutoff frequency or cutoff frequency-thickness product.

In some embodiments, ultrasonic guided wave tomography may be used to map the phase velocity of a mode of the guided ultrasonic wave 110 in a given plate-like structure, for instance the waveguide 106, which can then, using the dispersion curves, for instance the ones in plots 400 and 402, be converted into a thickness map of the waveguide 106.

In some embodiments, thickness reductions in the waveguide 106 may act as low pass filters. By propagating the guided ultrasonic wave 110 in the waveguide 106 of a given thickness and detecting the modes cut off, it may be possible to infer the minimum remnant thickness of the waveguide 106 along the propagation path of the guided ultrasonic wave 110. Using this method, the thickness of the waveguide 106 over longer distances may be determined.

FIG. 4B shows a plot 402 of dispersion curves for a SH wave propagating in a structure, for instance in the waveguide 106, representing phase and group velocities of the different modes that can propagate as a function of the frequency-thickness product. Modes $SH_0$, $SH_1$, $SH_2$, $SH_3$, $SH_4$, . . . are plotted. The absence of intersection points on the dispersion curves 402 between modes of the SH wave (compare with dispersion curves in plot 400) may allow a simpler interpretation of the data and a more regular thickness estimation of the waveguide 106 than with Lamb waves.

Figure 5:
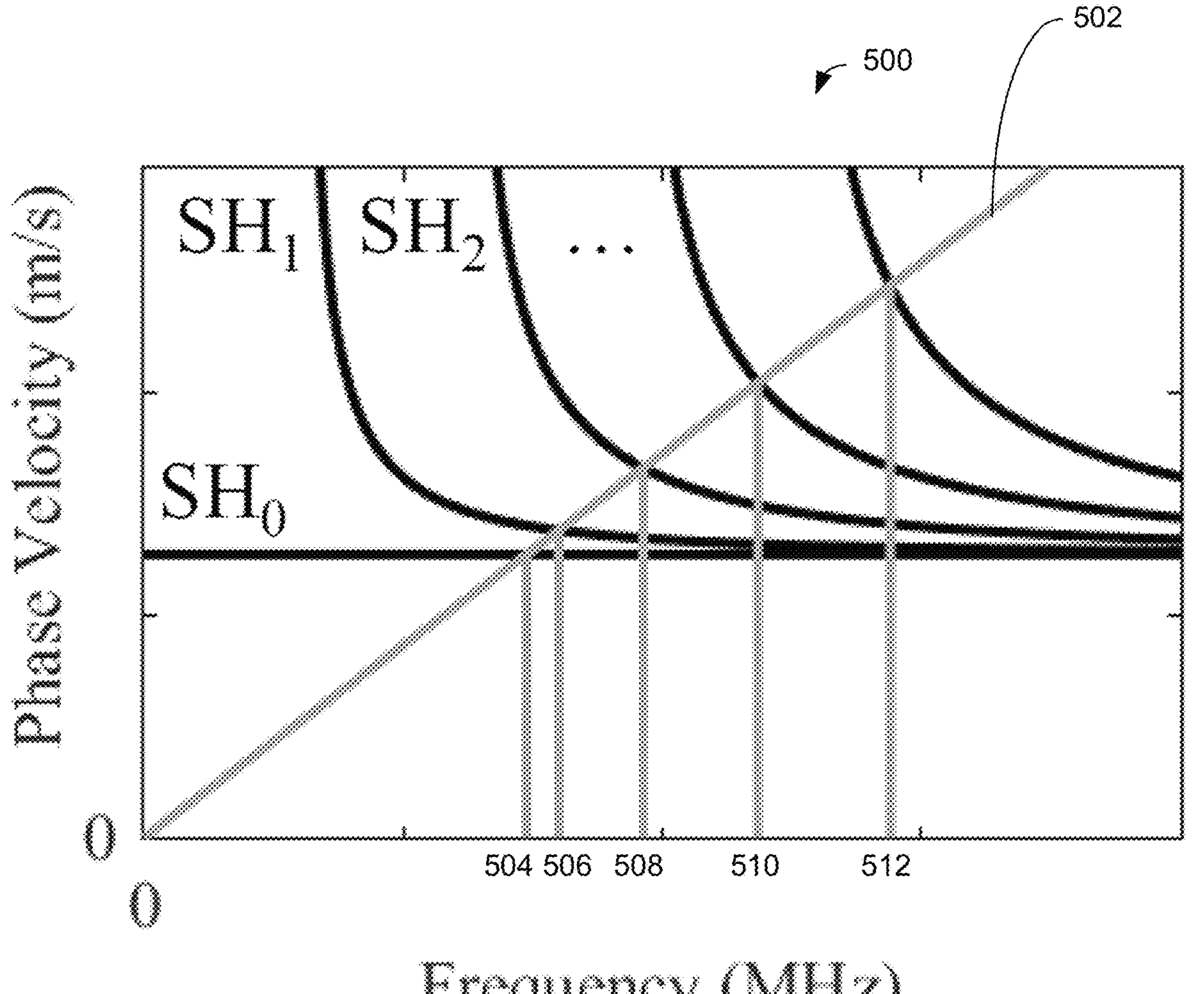
FIG. 5 is a plot showing dispersion curves for the electromagnetic acoustic transducer of FIG. 1, in accordance with an illustrative embodiment.

FIG. 5 shows a plot 500 for a SH wave propagating in a structure, for instance in the waveguide 106. Dispersion curves for the propagating SH wave are shown, similar to the dispersion curves in plot 402 of FIG. 4B. Line 502 represents the minimal wavelength detectable by a transducer, for instance the EMAT 100, having a certain pitch. Frequencies 504, 506, 508, 510, and 512 for modes $SH_0$, $SH_1$, $SH_2$, $SH_3$, and $SH_4$, respectively, of the propagating SH wave are indicated. The frequencies 504, 506, 508, 510, and 512 each represent the maximum frequency at which a given mode can be generated or detected. In some embodiments, the excitation of higher order modes in the high frequency range (i.e. above a given cutoff frequency) using the systems and methods disclosed herein may be of particular interest.

While the EMAT 100 is described and illustrated herein with reference to the excitation and detection of SH modes, it should be understood that other guided wave modes may be excited and/or detected using the EMAT proposed herein. This may be achieved by modifying the configuration of the transducer elements (e.g., modifying the winding of the coils as in 204 or the polarization of the magnets as in 202).

Figure 6:
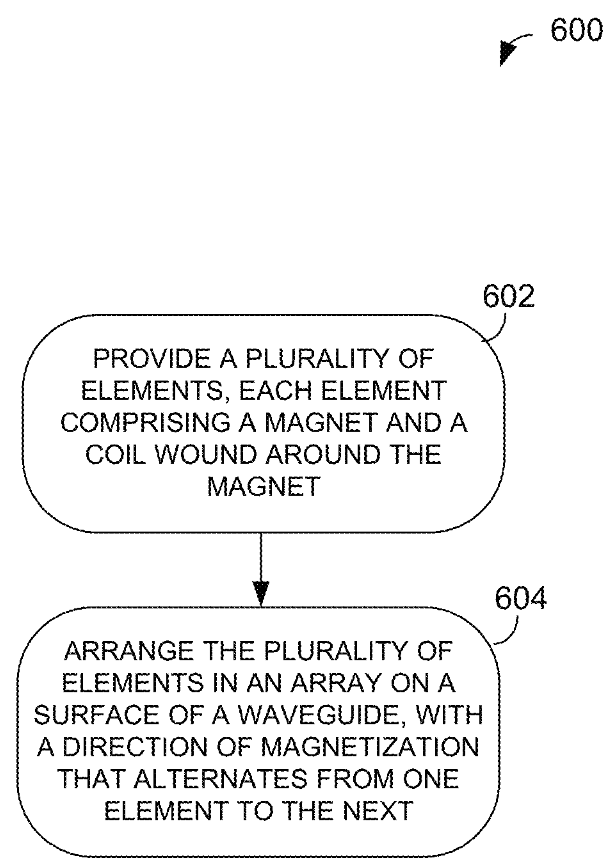
FIG. 6 is a flowchart illustrating an example method for assembling an electromagnetic acoustic transducer, in accordance with an illustrative embodiment.

Referring now to FIG. 6, a method 600 for providing (e.g., assembling) an electromagnetic acoustic transducer, for instance the EMAT 100, will now be described in accordance with one embodiment. At step 602, a plurality of elements, for instance the plurality of elements $\mathbf{102}_1$, $\mathbf{102}_2$, $\mathbf{102}_3$, . . . , $\mathbf{102}_N$, described above with reference to FIGS. 1, 2A, 2B, and 3, are provided. Each element comprises a magnet and a coil wound around the magnet. At step 604, the plurality of elements are arranged in an array on a surface of a waveguide (such as the waveguide 106 described above with reference to FIG. 1), with a direction of magnetization that alternates from one element to the next.

In order to validate the EMAT proposed herein, three-dimensional (3D) finite element simulations were performed. The element size was set to allow fifteen (15) elements per wavelength using the shortest wavelength to be simulated. The time step was defined such that the fastest ultrasonic wave packet could not, in a time increment, skip an element. The propagation of the ultrasonic wave was carried out using Pogo FEA®, an explicit time domain solver accelerated by graphics processing units (GPU), enabling the simulation of large models within a reasonable time frame and at a relatively low computing infrastructure cost. Wave generation was performed by importing a force field in a Pogo mesh. For each probe, a uniform force field was imposed under the surface of each element with a time variation corresponding to the signal used. Therefore, the effect of the displacement field on the Lorentz force was not taken into account. On the receiving end, the displacements were measured on each of the nodes below the elements. The distance between the transmitting and receiving probes was set to 20 cm. Finally, absorbing boundaries, designed with the Absorbing Layer with Increasing Damping (ALID) method, were added on the edges of the waveguide to reduce the amplitude of the echoes and thus simulate an infinite plate.

Figure 7:
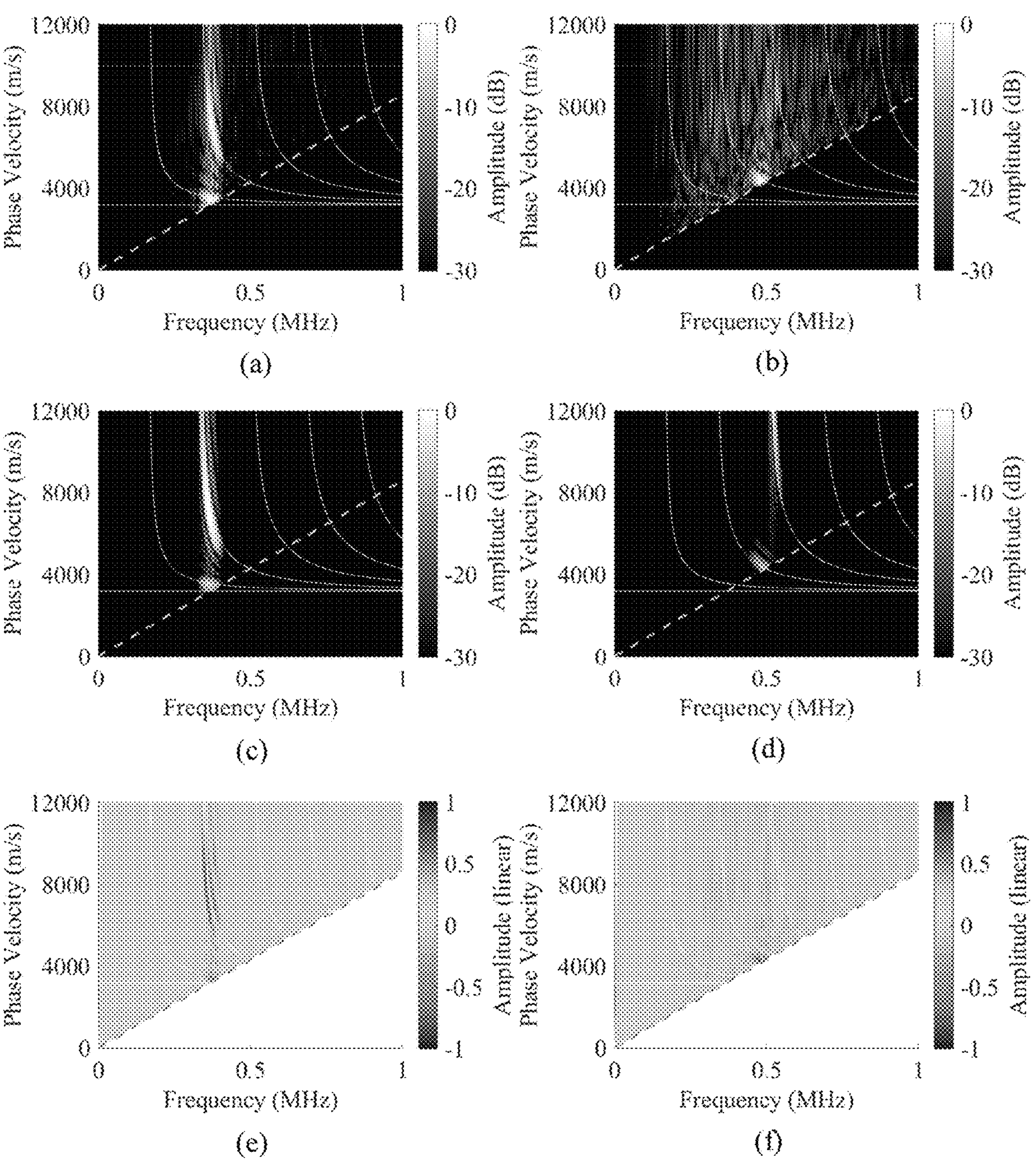
FIGS. 7, 8, and 9 illustrate two-dimensional Fourier transform (2DFFT) signals received with the electromagnetic acoustic transducer of FIG. 1, in accordance with an illustrative embodiment.

Several scenarios were then tested. First, a single element of the linear array structure proposed herein was used in transmission and a 20-element linear array probe (as described herein with reference to FIG. 2A) was used in reception. Each element was composed of a magnet and an encircling coil. The coil was composed of 50 turns of 0.32 mm diameter copper wire (28 AWG) and N55 grade neodymium magnets having a width (along the x direction) of 3.2 mm, a length (along the z direction) of 25.4 mm, a height (along the y direction) of 6.2 mm, and a through height (y) magnetization were used. The propagation distance was set to 20 cm. Narrow-band signals were used, with 15-cycle Hann-windowed tonebursts centered around 370 and 498 kHz. According to the dispersion curves (described herein with reference to FIGS. 4A, 4B, and 5), this should allow the excitation of $SH_0$, $SH_1$ and $SH_2$. This test was designed to verify the amplitude transmitted with a single element. FIG. 7 shows the energy distribution of the different modes on a phase velocity vs. frequency map. FIG. 7(*e*) and FIG. 7(*f*) were obtained by subtracting the corresponding simulation figure from the experimental one on a linear scale. The two graphs allow to better compare the difference between the simulated and the experimental cases. When the amplitude on a pixel of the image is 1, it means that the simulations have detected a mode at this position (frequency, phase velocity) and that no mode was detected experimentally. For a value of −1, the opposite is true. When values close to 0 are obtained, simulations and experiments are in agreement and the amplitudes detected for this pixel are identical.

As can be seen from FIG. 7, during a transmission centered around 370 kHz, three modes were excited. $SH_0$ and $SH_1$ were excited at a phase velocity of about 3600 m/s and $SH_2$ at a phase velocity higher than 4800 m/s. For the excitation around 498 kHz, only $SH_2$ was excited around a phase velocity of 4400 m/s. A closer look at FIG. 7(*e*) reveals a shift of about 20 kHz on the excitation frequency of $SH_2$. This error can simply be explained by the fact that the properties of the steel plate for the simulations were approximated. An inaccuracy in the material properties can shift the dispersion curves on both the phase velocity and frequency axes. The preceding notwithstanding, the experimental results were very similar to the predictions obtained by simulations and prove the capabilities of the proposed EMAT linear array when it comes to detecting and separating one or more high-order SH modes in the case of a narrow frequency band emission.

A second case investigated the use of a broadband PPM EMAT associated with a chirp sweeping from 300 to 800 kHz over 50 μs. The PPM EMAT was realized with 2×9 magnets by progressively increasing the distance between two successive magnets. The pitch was varied from 3.2 to 6.8 mm. By generating a multimodal wave, it was possible to evaluate whether the EMAT linear array proposed herein allows to measure (using two-dimensional Fourier transform (2DFFT)) the amplitude of several high-order modes at the same time. For this purpose, the input signal transmitted to the probe was a chirp varying from 300 to 800 kHz over 50 μs. The reception was performed with the EMAT linear array and a laser vibrometer used mainly to allow a comparison without the influence of the bandwidth of the receiving probe.

Figure 8:
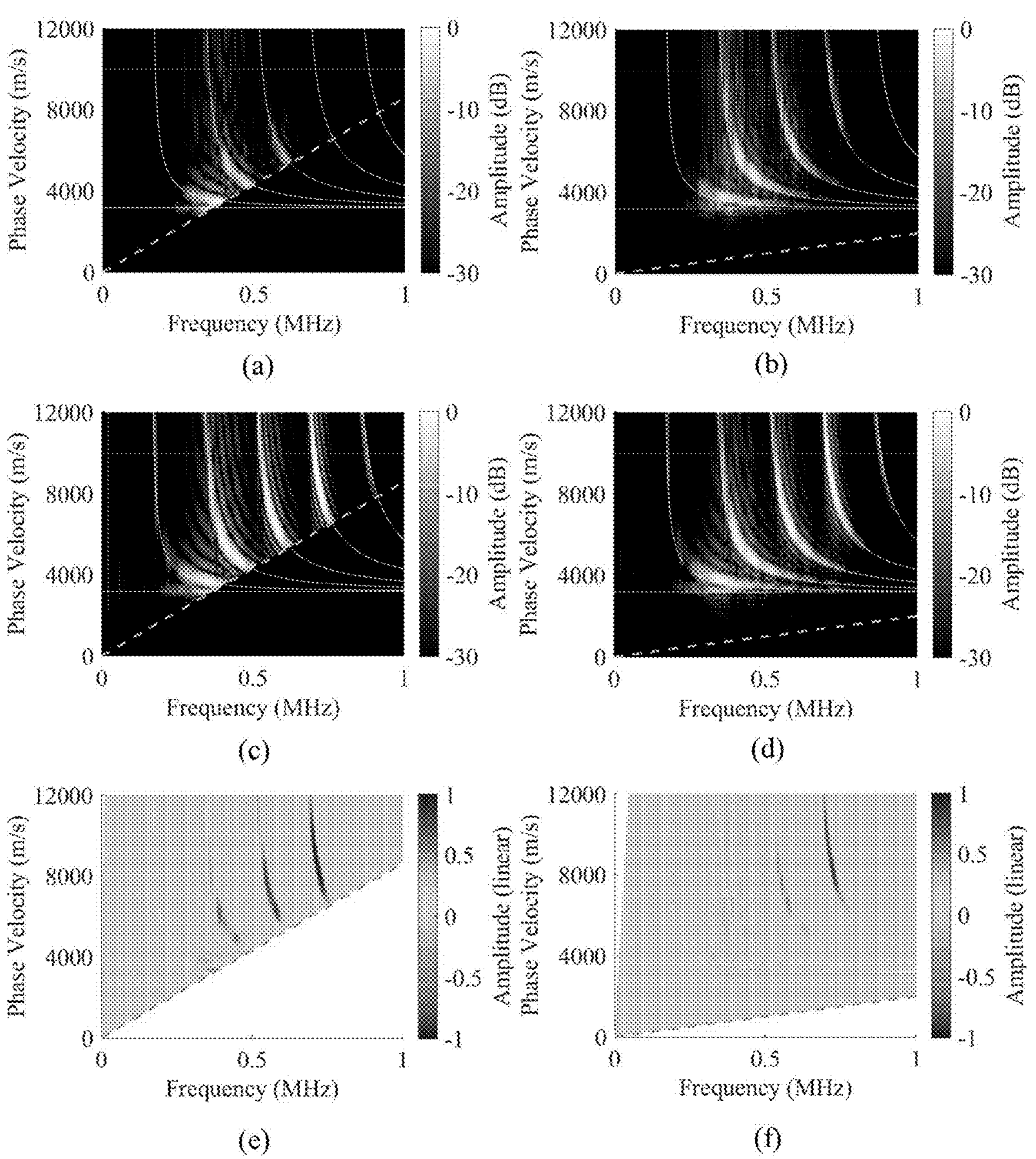

FIG. 8(*a-c-e*) presents the 2DFFT, on a phase velocity vs frequency diagram, of the signals obtained experimentally and by simulation using the EMAT linear array in reception, and FIG. 8(*b-d-f*), using the laser vibrometer. Experimentally, $SH_0$ to $SH_3$ were detected by the EMAT linear array. However, the amplitude decreases with the mode order. The modes with the highest amplitudes were $SH_0$ and $SH_1$, while the amplitude of $SH_2$ was −5 dB and that of $SH_3$ was −12 dB. Measurements with the laser vibrometer also showed a loss of amplitude with the order of the mode but on a smaller scale. $SH_0$ to $SH_2$ were detected with a maximum amplitude of 0 dB, while that of $SH_3$ was −5 dB and for $SH_4$ it was −15 dB. The predictions by simulations were identical in both cases, and looking at FIG. 8(*c*), it can be seen that the simulations predicted that $SH_0$ to $SH_4$ should be excited homogeneously and that SH 5 was outside the bandwidth of the signal used, and would be detected with a lower amplitude. The difference between the experimental and simulation results can be explained by the fact that no attenuation was considered in the finite element models. The amplitude of high-order modes at a higher frequency is therefore overestimated in the simulations. One explanation for the discrepancy between the results using the EMAT linear array and those using the laser vibrometer could be that the bandwidth of the EMAT and of its receiving electronics is narrower than that of the laser.

Figure 9:
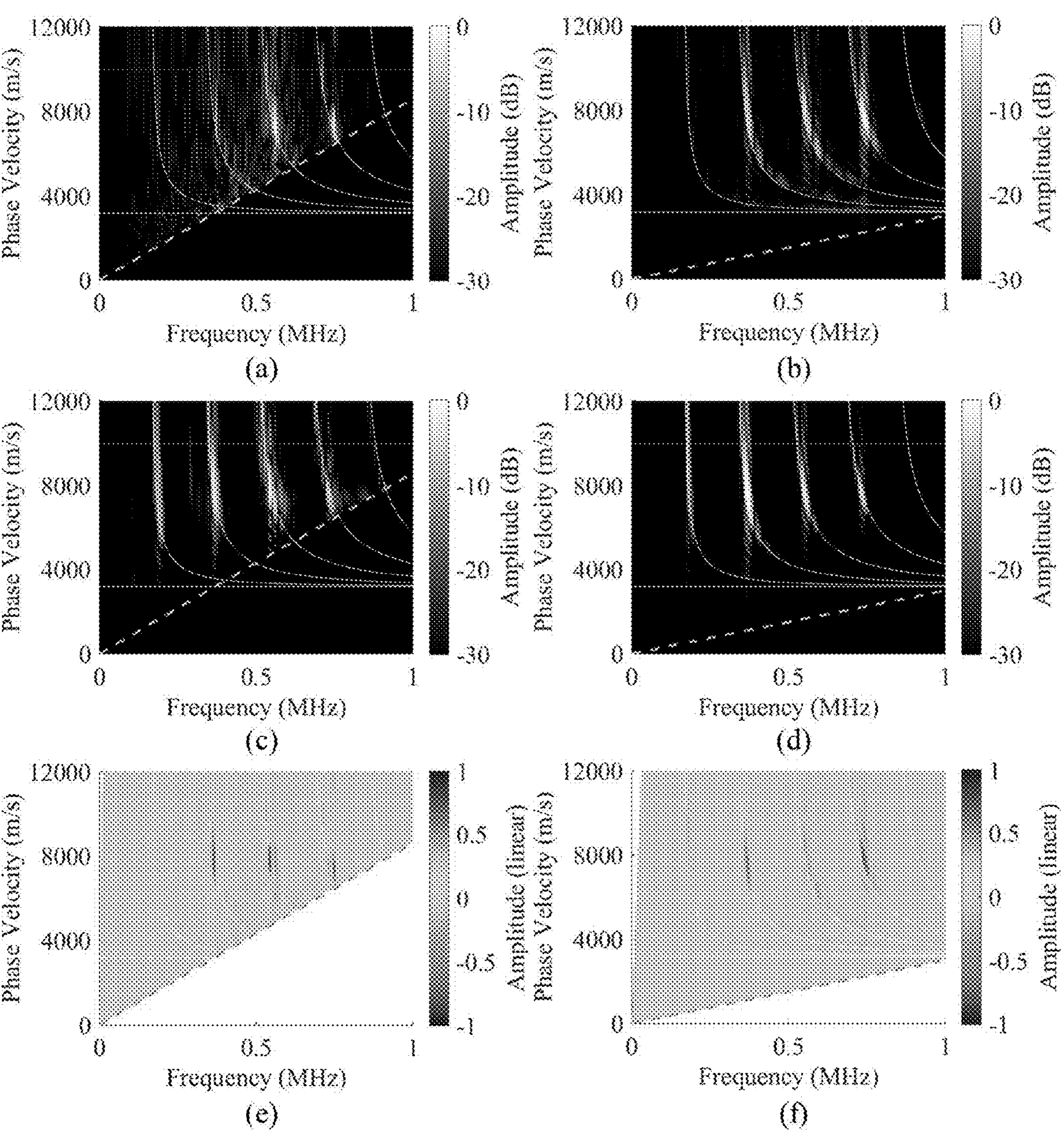

For the last validation case, the ability of the EMAT linear array to generate and detect an SH wave was compared to that of a piezoelectric shear ultrasonic phased array (PA) probe (e.g., the Olympus 0.75L64-96X22-CA-P-2.5-OM-POL shear PA probe). Both probes were successively used in transmission and reception. When transmitting with the PA probe, a single-cycle Hann-windowed toneburst centered around 750 kHz was used and a delay law allowing a constant phase velocity excitation of around 7300 m/s was implemented. When the EMAT linear array was used in transmission, the acquisition was performed sequentially due to a lack of an EMAT array controller. A full matrix capture (FMC) was performed by combining all the transmitting elements of the EMAT linear array and the receiving elements of the PA probe. The signal used was a chirp sweeping from 300 to 800 kHz over 50 μs. An excitation around a constant phase velocity of 7300 m/s was generated in post-processing by adding the corresponding delay to each transmission frame (see Eq.(5)) to allow a comparison of the two technologies. The separation distance was 20 cm. Sampling in time and space was performed to apply a 2DFFT. FIG. 9(*a*) shows the experimental results obtained in this configuration, FIG. 9(*c*) shows those obtained by simulation, and FIG. 9(*e*) shows the difference between the figure obtained by simulation and the one obtained experimentally on a linear scale. First, it can be observed that the excitation of the modes occurs around 7300 m/s. However, only $SH_3$ and $SH_4$ are detected experimentally, whereas the simulations predicted an excitation from $SH_1$ to $SH_4$. The most likely reason for this difference between the simulation and experiments relates to the bandwidth of the phased array probe. According to the probe documentation, the amplitude of the transfer function at 500 kHz is 24 dB below its value at 750 kHz. $SH_1$ and $SH_2$ were likely generated at an amplitude too low to be detected.

The second part of this validation step consisted in using the EMAT linear array in transmission and the shear PA probe in reception. The signal used was a chirp sweeping from 300 to 800 kHz over 50 μs. Due to equipment limitations, only one element of the EMAT could be activated at a time, making a constant phase velocity excitation impossible. The solution used was to proceed to an FMC by combining all the transmitting elements of the EMAT linear array and the receiving elements of the PA probe. The corresponding delay was then added, in post-processing, to each transmission frame to reconstruct a constant phase velocity excitation around 7300 m/s. As can be seen experimentally (FIG. 9(*b*)) or by simulation (FIG. 9(*d*)), the modes were excited around a phase velocity of 7300 m/s. $SH_1$ could not be detected experimentally. $SH_2$ is visible, but has an amplitude 6 dB below the amplitude predicted by simulation. As before, this phenomenon is most likely due to the bandwidth of the phased array probe, since it is not present in the results of configurations involving only EMATs (FIG. 7 and FIG. 8). These results are nevertheless encouraging because the capabilities of the EMAT array developed to generate and detect SH modes are similar to those of a piezoelectric phased array probe.

Figure 10:
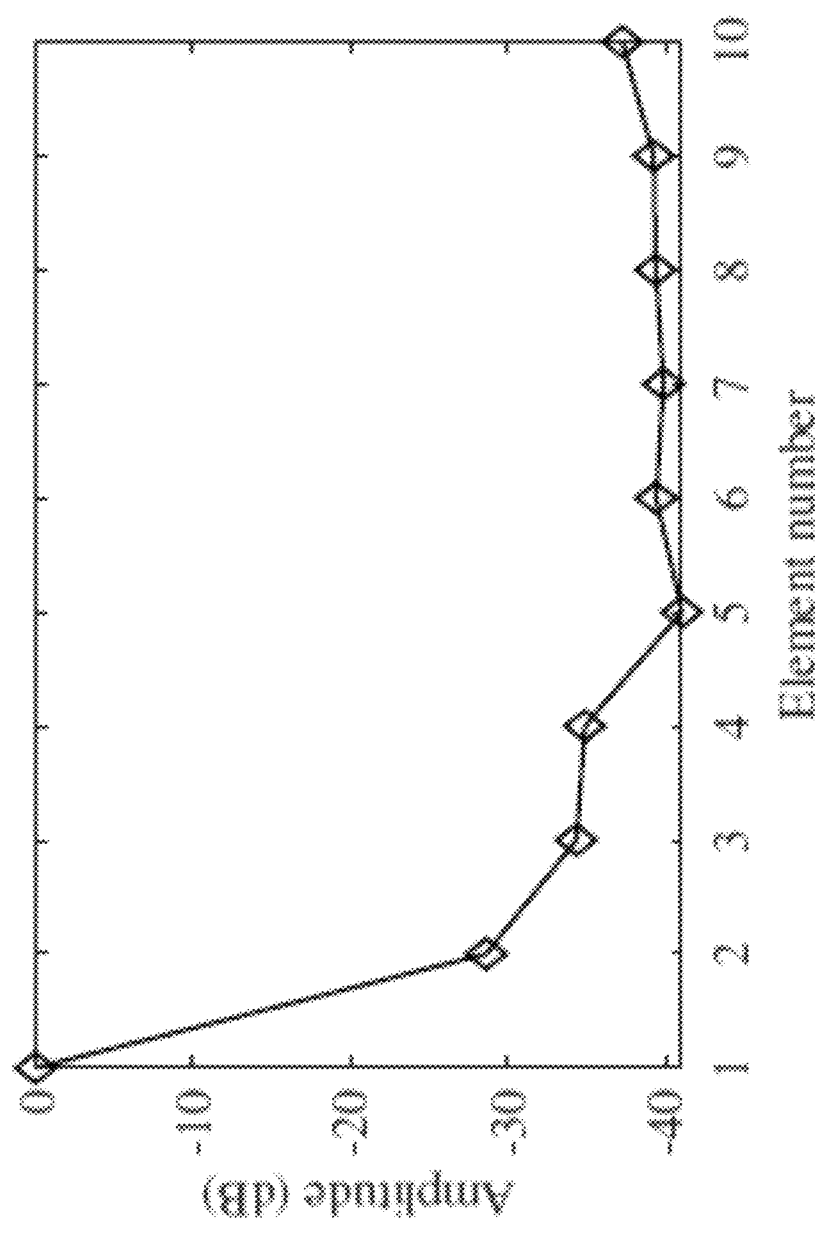
FIG. 10 is a plot of measured crosstalk between elements of the electromagnetic acoustic transducer of FIG. 1, in accordance with an illustrative embodiment.

Crosstalk between elements of the EMAT array was also investigated. Crosstalk refers to the coupling between two unconnected cables and is a phenomenon inherent to any measurement using alternating current. If the coupling is too strong, the current generated by one of the transducer elements will be instantly transmitted to the other elements in the vicinity, which will pollute the measured waveforms. To evaluate the crosstalk between the different elements, an EMAT linear array of ten (10) elements was assembled and positioned on a steel plate in order to simulate usage in real conditions. The first element of the structure was connected to the arbitrary function generator port of a TiePie HSS. The signal used was a 5-cycle Hann windowed toneburst centered around a frequency of 500 kHz with an amplitude of 4 V peak to peak. The results are presented in FIG. 10 and show the relative amplitude of the waveform due to crosstalk as compared to the signal supplied to the transmitter coil. As can be noted, a 28 dB loss of amplitude can be seen between the first and second elements, corresponding to a division of the amplitude by 25 on a linear scale. From the fifth element, this loss is between 37 and 41 dB. The amplitude of a crosstalk signal induced between the elements will therefore be at least 28 dB below the amplitude of the waveform generated by the propagation of a wave below one of the elements. The crosstalk between the elements may therefore be considered negligible for the EMAT proposed herein.

From the above, it can be seen that, in one embodiment, the EMAT proposed herein may advantageously allow for flexibility with regards to the choice of the excitation mechanism (i.e. the emission technique) used, which can be a comb or a constant phase velocity excitation, for example. On the reception side, the multi-element nature of the EMAT may allow to sample propagating modes in space and time, allowing for the use of 2DFFT processing to separate and extract the amplitude of the different modes. In particular, in one embodiment, the minimum detectable wavelength, or the maximum detectable wavenumber, is equal to twice the pitch. The aperture, equal to the pitch multiplied by the number of transducer elements (as in $\mathbf{102}_1$, $\mathbf{102}_2$, $\mathbf{102}_3$, . . . , $\mathbf{102}_N$, in FIG. 2A), may then determine the wavenumber step of the energy map obtained with the 2DFFT.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps As can be understood, the examples described above and illustrated are intended to be exemplary only. The scope is indicated by the appended claims.

What is claimed is:

1. An electromagnetic acoustic transducer comprising:

a waveguide having a surface; and a plurality of transducer elements comprising a plurality of magnets spaced apart from one another and arranged in an array on the surface of the waveguide and a plurality of coils each coil of the plurality of coils wound around a respective magnet of the plurality of magnets to form a respective transducer element of the plurality of transducer elements, a direction of magnetization of the plurality of transducer elements alternating from one of the plurality of transducer elements to a next one of the plurality of transducer elements to generate opposite currents from the one of the plurality of transducer elements to the next one of the plurality of transducer elements.

2. The transducer of claim 1, wherein the waveguide is made of a ferromagnetic and conductive material.

3. The transducer of claim 1, wherein the plurality of transducer elements are in direct contact with the surface of the waveguide.

4. The transducer of claim 1, wherein the waveguide is a plate-like structure.

5. The transducer of claim 1, wherein the waveguide is a section of pipeline.

6. The transducer of claim 1, wherein the direction of magnetization of each transducer element of the plurality of transducer elements is orthogonal to the surface of the waveguide.

7. The transducer of claim 1, wherein the plurality of transducer elements are arranged in a linear array.

8. The transducer of claim 1, wherein the plurality of transducer elements are arranged in a two-dimensional array.

9. The transducer of claim 1, wherein each coil is configured to be supplied with an excitation signal via comb excitation in which the plurality of transducer elements are substantially simultaneously activated with the excitation signal.

10. The transducer of claim 1, wherein each coil is configured to be supplied with an excitation signal via phase velocity excitation in which the plurality of transducer elements are activated with the excitation signal with a time delay.

11. The transducer of claim 1, wherein the plurality of transducer elements are spaced apart from one another by a regular distance.

12. The transducer of claim 1, wherein the plurality of transducer elements are spaced apart from one another by an irregular distance.

13. The transducer of claim 1, wherein the waveguide is configured to have an ultrasonic wave propagating therein, along a direction of propagation substantially perpendicular to the direction of magnetization of the plurality of transducer elements.

14. The transducer of claim 13, wherein the ultrasonic wave is a Lamb wave comprising a plurality of symmetrical modes and a plurality of antisymmetrical modes.

15. The transducer of claim 13, wherein the ultrasonic wave is a shear horizontal (SH) wave.

16. The transducer of claim 1, wherein each transducer element of the plurality of transducer elements is separately supplied with a respective excitation signal.

17. A method for providing an electromagnetic acoustic transducer, the method comprising:

providing a plurality of transducer elements, a plurality of magnets, and a plurality of coils, each coil of the plurality of coils wound around a respective magnet of the plurality of magnets to form a respective transducer element of the plurality of transducer elements providing a waveguide having a surface; and arranging the plurality of transducer elements in an array on the surface of the waveguide, with a direction of magnetization of the plurality of transducer elements alternating from one of the plurality of transducer elements to a next one of the plurality of transducer elements to generate opposite currents from the one of the plurality of transducer elements to the next one of the plurality of transducer elements.

18. The method of claim 17, wherein the plurality of transducer elements are arranged in one of a linear array and a two-dimensional array.

19. The method of claim 17, further comprising supplying an excitation signal to each coil via comb excitation.

20. The method of claim 17, further comprising supplying an excitation signal to each coil via phase velocity excitation.

21. The method of claim 17, wherein arranging the plurality of transducer elements in the array comprises spacing the plurality of elements apart from one another by one of a regular and an irregular distance.

* * * * *